(12) United States Patent
Suzuki et al.

(10) Patent No.: US 7,233,238 B2
(45) Date of Patent: Jun. 19, 2007

(54) TIRE AIR-PRESSURE ALARMING DEVICE, TIRE MONITORED THEREBY AND CONTROL METHOD FOR PROPERTIES OF TIRE

(75) Inventors: Motoshi Suzuki, Kariya (JP); Hidenori Kajino, Toyota (JP); Minao Yanase, Kobe (JP)

(73) Assignees: Advics Co., Ltd., Aichi-pref. (JP); Sumitomo Rubber Industries, Ltd., Hyogo-pref. (JP)

( * ) Notice: Subject to any disclaimer, the term of this patent is extended or adjusted under 35 U.S.C. 154(b) by 209 days.

(21) Appl. No.: 10/940,980

(22) Filed: Sep. 15, 2004

(65) Prior Publication Data

US 2005/0081616 A1  Apr. 21, 2005

(30) Foreign Application Priority Data

Sep. 17, 2003  (JP)  ............................... 2003-324436

(51) Int. Cl.
*B60C 23/00* (2006.01)
(52) U.S. Cl. ........................ 340/444; 340/442; 73/146; 73/146.2; 137/224
(58) Field of Classification Search ........ 340/442–449; 73/146.2, 146, 146.5; 116/42 R, 34 A, 34 B, 116/34 R
See application file for complete search history.

(56) References Cited

U.S. PATENT DOCUMENTS

| 5,218,862 | A | * | 6/1993 | Hurrell et al. ............. 73/146.5 |
| 5,710,539 | A | | 1/1998 | Iida |
| 6,731,205 | B2 | * | 5/2004 | Schofield et al. ............ 340/444 |
| 6,914,523 | B2 | * | 7/2005 | Munch et al. ............... 340/447 |
| 2002/0059826 | A1 | * | 5/2002 | Ono et al. .................. 73/146.5 |
| 2002/0194904 | A1 | * | 12/2002 | Kawasaki et al. ............ 73/146 |
| 2003/0121319 | A1 | | 7/2003 | Kojima et al. |

FOREIGN PATENT DOCUMENTS

JP    07-156621    6/1995

\* cited by examiner

*Primary Examiner*—Jeffery Hofsass
*Assistant Examiner*—Hoi C. Lau
(74) *Attorney, Agent, or Firm*—Posz Law Group, PLC

(57) ABSTRACT

A tire air-pressure alarming device includes wheel speed sensors for detecting wheel speeds of wheels of a motor vehicle and also includes a microcomputer-base control device and an alarming unit. The control device is programmed to execute function steps of: deriving a decision value based on the wheel speeds detected by the wheel speed sensors; judging the occurrence of air-pressure drop of the tires constituting wheels, based on the decision value; and outputting a command when the occurrence of the air-pressure drop of the tires is judged. The alarming unit is responsive to the command from the control device thereby to raise an alarm indicating the occurrence of the air-pressure drop of the tire. The tires are monitored by the tire air-pressure alarming device, wherein the control device is also programmed to execute a function step of standardizing the speed dependency of a rolling radius of the tires thereby to standardize the performance in judging the air-pressure drop of the tires. Thus, the tire property can be controlled to improve the accuracy in detecting the tire air-pressure drop.

19 Claims, 6 Drawing Sheets

Conditions of
Pressure and Wheel Load
① 200kPa,200kgf
② 200kPa,500kgf

TIRE AIR-PRESSURE ALARMING DEVICE, TIRE MONITORED THEREBY AND CONTROL METHOD FOR PROPERTIES OF TIRE

INCORPORATION BY REFERENCE

This application is based on and claims priority under 35 U.S.C. 119 with respect to Japanese Application No. 2003-324436 filed on Sep. 17, 2003, the entire content of which is incorporated herein by reference.

BACKGROUND OF THE INVENTION

1. Field of the Invention

The present invention relates to a tire air-pressure alarming device for alarming a tire air-pressure drop based on a result obtained by indirectly detecting the state of tire air pressure in a motor vehicle. It further relates to a tire monitored by the device and a control method for property values of the tire.

2. Discussion of the Related Art

Heretofore, as tire air-pressure alarming devices of this kind, there has been known one described in Japanese unexamined, published patent application No. 07-156621 for example. The known device comprises wheel speed detection means for detecting the wheel speeds of wheels of a motor vehicle, decision value deriving means for deriving a decision value based on the wheel speeds detected by the wheel speed detection means, air-pressure drop judging means for judging the tire air-pressure drop of the wheels based on the decision value derived by the decision value deriving means, and alarming means for raising an alarm when the tire air pressure of the wheels is judged by the air-pressure drop judging means to have dropped.

In the device, the air-pressure drop can be detected correctly by accurately and speedy compensating for initial differences of the tires which are caused by a dispersion of the tire property in production (including replacement of tires, air replenishment into the tires and the like). More specifically, as shown in FIGS. 1 and 2 of the aforementioned Japanese application, the speed Vi of each tire is detected (step S4), forward-rearward acceleration Ai is calculated based on the speed Vi when the same is larger than a threshold value $V_{TH}$ (step S7), and further, when the calculated forward-rearward acceleration is smaller than the threshold value $V_{TH}$, it is judged whether or not the vehicle is in a straight-ahead traveling (step S9). As a result, when the vehicle is in the straight-ahead traveling, a rotational angular velocity Fi is stored in a rotational angular velocity area of a RAM for use in an initial compensation processing (step S10). The foregoing processing steps are repetitively executed until the traveling distance of the vehicle reaches a predetermined distance. When the traveling distance of the vehicle reaches the predetermined distance, a compensation coefficient Ci is calculated by the use of only the rotational angular velocities Fi being stored in the rotational angular velocity area (step S14). In accordance with the foregoing processing, the initial compensation processing can be executed more accurately since in the initial compensation, the rotational angular velocities Fi suitable for the initial compensation are selected and since the compensation coefficient Ci is calculated by using the selected rotational angular velocities Fi only.

In the compensation for the initial differences in the foregoing device, the dispersion of the tire property can be relieved by performing the compensation which takes traveling conditions into consideration, during the traveling of the vehicle. However, there arises a problem in that where the dispersion is large, it cannot be compensated to a full extent. Further, even if the initial differences were relieved, it is not carried out in the known device to relieve the dispersions (hereafter referred to as "property variation differences") which are caused by vehicle speed, wheel load (load on one wheel) and property variation in tire air-pressure. This gives rise to another problem that variations in the vehicle speed, the wheel load and the tire air-pressure property make it unable to detect the tire air-pressure drop precisely. That is, since each tire is not controlled in properties thereof, decision values a disperse large with the tires set under a normal pressure, and the sensitivity to the decision values a also fluctuates large with the decrease in the tire pressure. Thus, further problems arise in that the air-pressure drop is detected in spite of the fact that the tires are sufficient in air pressure or that the air-pressure drop is not detected in spite of the fact that the tire air pressure is below a lower limit for judgment.

SUMMARY OF THE INVENTION

Accordingly, it is a primary object of the present invention to improve the accuracy in detecting the tire air-pressure drop by controlling the properties of each tire.

According to the present invention, there is provided a tire monitored by a tire air-pressure alarming device comprising wheel speed detection means for detecting wheel speeds of wheels of a vehicle; decision value (judgment value) deriving means for deriving a decision value (judgment value) based on the wheel speeds detected by the wheel speed detection means; air-pressure drop judging means for judging the occurrence of air-pressure drop of the tires constituting the wheels, based on the decision value derived by the decision value deriving means; and alarming means for raising an alarm when the occurrence of the air-pressure drop of the tires is judged by the air-pressure drop judging means. The performance in judging the air-pressure drop of the tires by the air-pressure drop judging means is standardized by standardizing a property value of the tires.

In the tire according to the present invention, the performance in judging the air-pressure drop of the tires by the air-pressure drop judging means is standardized by standardizing the property value of the tires. Therefore, the accuracy in detecting the air-pressure drop of the tires can be improved by controlling the property of the tires.

In another aspect of the present invention, there is provided a control method for a property value of tires monitored by a tire air-pressure alarming device. The tire air-pressure alarming device comprises wheel speed detection means for detecting wheel speeds of wheels of a vehicle; decision value deriving means for deriving a decision value based on the wheel speeds detected by the wheel speed detection means; air-pressure drop judging means for judging the occurrence of air-pressure drop of the tires constituting the wheels, based on the decision value derived by the decision value deriving means; and alarming means for raising an alarm when the occurrence of the air-pressure drop of the tires is judged by the air-pressure drop judging mean. The performance in judging the air-pressure drop of the tires by the air-pressure drop judging means is standardized by standardizing a property of the tires.

In the control method according to the present invention, the performance in judging the air-pressure drop of the tires by the air-pressure drop judging means is standardized by standardizing the property value of the tires. Therefore, the property of the tires is controlled accurately and reliably, so that the accuracy in detecting the air-pressure drop of the tires can be improved.

In a further aspect of the present invention, there is provided a tire air-pressure alarming device which comprises wheel speed detection means for detecting wheel speeds of wheels of a vehicle; decision value deriving means for deriving a decision value based on the wheel speeds detected by the wheel speed detection means; air-pressure drop judging means for judging the occurrence of air-pressure drop of the tires constituting the wheels, based on the decision value derived by the decision value deriving means; and alarming means for raising an alarm when the occurrence of the air-pressure drop of the tires is judged by the air-pressure drop judging means. The performance in judging the air-pressure drop of the tires by the air-pressure drop judging means is standardized by standardizing a property of the tires.

In the tire air-pressure alarming device according to the present invention, the performance in judging the air-pressure drop of the tires by the air-pressure drop judging means is standardized by standardizing the property value of the tires. Therefore, the property of the tires is controlled accurately and reliably, so that the accuracy in detecting the air-pressure drop of the tires can be improved.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
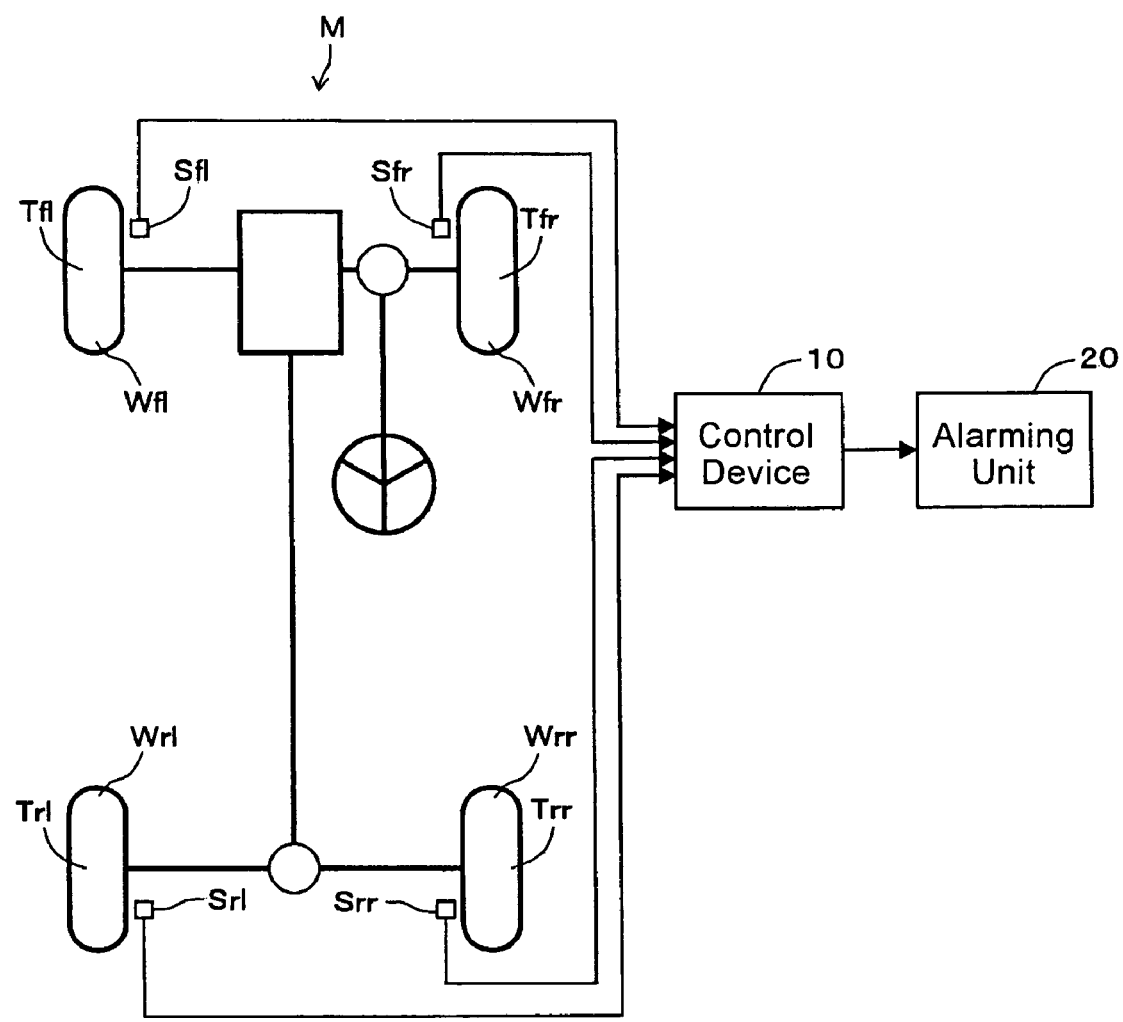
FIG. 1 is a schematic block diagram showing a tire air-pressure alarming device for monitoring tires according to the present invention.

Hereinafter, a tire air-pressure alarming device for monitoring the air-pressure of tires in one embodiment according to the present invention will be described with reference to the accompanying drawings. FIG. 1 shows a block diagram of the tire air-pressure alarming device.

The tire air-pressure alarming device is provided with wheel speed sensors Sfl, Sfr, Srl and Srr, a control device 10, and an alarming unit 20. The wheel speed sensors Sfl, Sfr, Srl and Srr are provided for detecting wheel speeds of front and rear left and right wheels Wfl, Wfr, Wrl, Wrr, which are composed of wheels (not shown) and tires Tfl, Tfr, Trl and Trr placed on the wheels, respectively. The sensors Sfl, Sfr, Srl and Srr pick up the rotations of these wheels Wfl, Wfr, Wrl, Wrr and output to the control device 10 pulse train signals of the frequencies which are inversely proportional to the detected rotational speeds, respectively.

The control device 10 incorporates a microcomputer (not shown), which is provided with an input/output interface, a CPU, a RAM and a ROM connected thereto through a bus (all not shown). The CPU executes a program corresponding to a flow chart shown in FIG. 2 for deriving a decision value (judgment value) based on the wheel speeds input thereto, for judging the occurrence of tire air-pressure drop based on the decision value, and for controlling the alarming unit 20 in dependence on a result of such judgment. The ROM is provided for storing the program, and the RAM is provided for temporally storing calculation values under control.

The alarming unit 20 is constituted by a display unit (e.g., CRT display, liquid crystal display or the like) and is capable of displaying any one of the tires whose air-pressure has dropped, in response to a command from the control device 10. Instead, the alarming unit 20 may be constituted by an audio generator such as, e.g., speaker or the like, in which case an announcement may be given by sound to designate the tire which has dropped in the air pressure.

Figure 2:
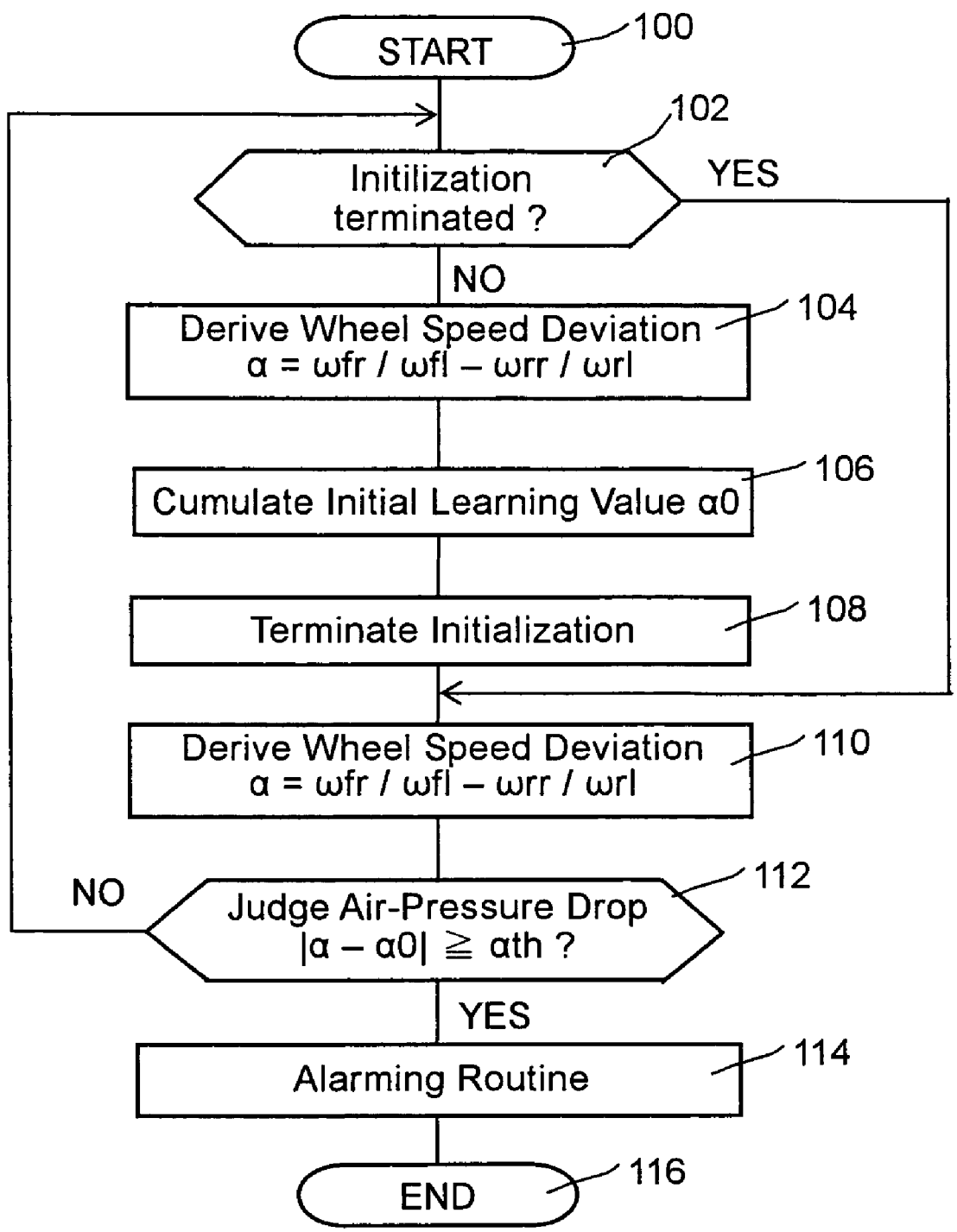
FIG. 2 is a flowchart showing a program executed by a control device shown in FIG. 1.

Next, the operation of the tire air-pressure alarming device as constructed above will be described in accordance with the flow chart shown in FIG. 2. The control device 10 executes the program corresponding to the flow chart while an ignition switch (not shown) of a vehicle M is in an ON-state. After starting the program execution at step 100 in FIG. 2, the control device 10 judges at step 102 whether or not an initialization has been terminated. Unless having terminated the initialization, the control devices 10 calculates a wheel speed deviation α in a reference state and derives an initial learning value α0 through steps 104–108. That is, at step 104, the wheel speed deviation α is derived by the use of the following expression 1 from wheel speeds (rotational angular velocities of the tires) ωfl, ωfr, ωrl, ωrr of the four wheels Wfl, Wfr, Wrl, Wrr of the vehicle M.

$$\alpha = \omega fr/\omega fl - \omega rr/\omega rl \quad \text{(Expression 1)}$$

Then, at step 106, the initial learning value α0 is calculated by taking an average value of plural pieces of wheel speed deviations α which have been previously derived and stored. Subsequently, the initialization is terminated at step 108. After the termination of the initialization in this manner, the control device 10 judges as "YES" at step 102 thereby to advance the program to step 110.

The wheel speed deviation α is derived at step 110. The wheel speed deviation α is derived by the foregoing expression 1 in the same manner as the processing at step 104. More specifically, the control device 10 derives the wheel speeds ωfl, ωfr, ωrl, ωrr from the pulse train signals input from the wheel speed sensors Sfl, Sfr, Srl and Srr and derives the wheel speed deviation α by the foregoing expression 1 based on the wheel speeds ωfl, ωfr, ωrl, ωrr.

Figure 3:
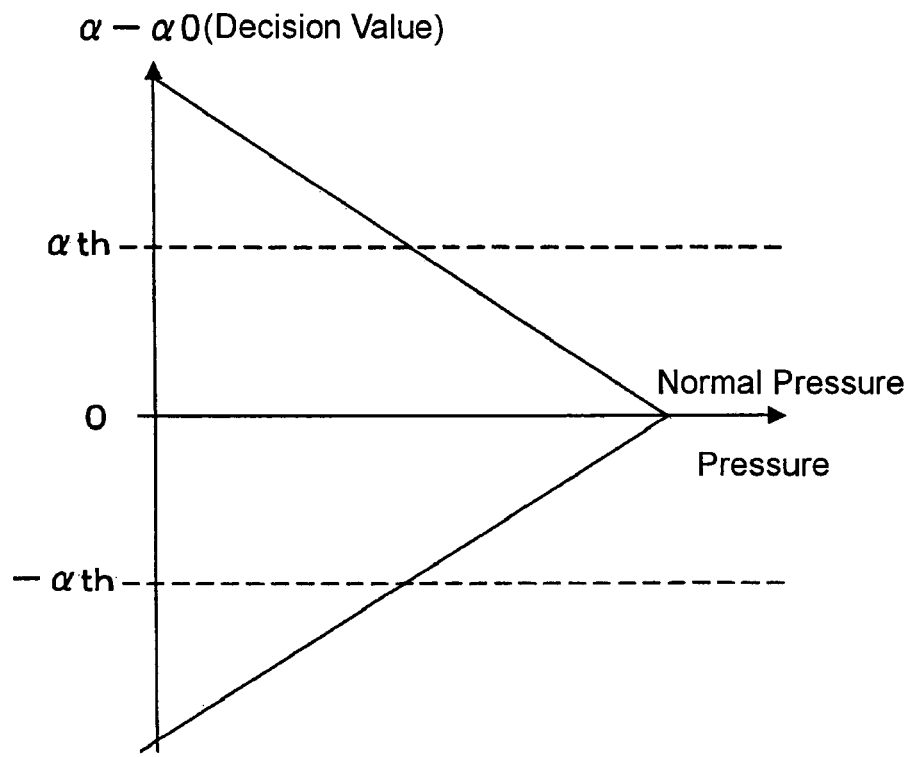
FIG. 3 is a graph showing the relation between a decision value and tire air-pressure.

The control device 10 at step 112 judges the occurrence of the tire air-pressure drop based on a decision value α−α0 which is derived based on wheel speed deviation α having been derived at step 110 and the initial learning value α0 having been derived at step 106. Specifically, where the absolute value |α−α0| of the decision value α−α0 which is the difference between the wheel speed deviation α and the initial learning value α0 is less than a decision threshold value αth, the air pressure of the tires is judged not to have dropped. On the contrary, where the absolute value |α−α0| is greater than or equal to the decision threshold value αth, the air pressure of the tires is judged to have dropped. That is, for example, where the air pressure drop has not occurred with any of the four-wheels during a straight-ahead traveling of the vehicle M, the wheel speeds ωfl, ωfr, ωrl, ωrr of the four wheels indicate approximately the same values as those detected during the initial learning, whereby the decision value α−α0 comes to the vicinity of 0 (zero) as shown in FIG. 3.

On the other hand, where the air pressure drop has occurred with one of the four wheels during a straight-ahead traveling of the vehicle M, such one wheel decreases in the tire radius thereby to make its wheel speed faster than those of other tires, whereby the decision value α−α0 fluctuates. For example, when the air-pressure drop occurs with the front left wheel Wfl, the wheel speed ωfl of the same is increased thereby to make the first term of (ωfr/ωfl) of the right-hand side in the expression 1 less than the second term (ωrr/ωrl) of the same side, and thus, the decision value α−α0 becomes less than 0 (zero). When the air-pressure drop occurs with the front right wheel Wfr, the wheel speed ωfr of the same is increased thereby to make the first term of the right-hand side in the expression 1 grater than the second term of the same side, and thus, the decision value α−α0 becomes grater than 0 (zero). When the air-pressure drop occurs with the rear left wheel Wrl, the wheel speed ωrl of the same is increased thereby to make the second term of the right-hand side in the expression 1 less than the first term of the same side, and thus, the decision value α−α0 becomes grater than 0 (zero). Further, When the air-pressure drop occurs with the rear right wheel Wrr, the wheel speed ωrr of the same is increased thereby to make the second term of the right-hand side in the expression 1 greater than the first term of the same side, and thus, the decision value α−α0 becomes less than 0 (zero). Accordingly, where the decision value α−α0 which fluctuates with the air pressures of the tires becomes grater than a decision upper limit αth in this way, the air pressure of the front right wheel Wfr or the rear left wheel Wrl is judged to have dropped. Where the decision value α−α0 becomes less than the decision lower limit −αth, the air pressure of the front left wheel Wfl or the rear right wheel Wrr is judged to have dropped.

Further, when judging at step 112 that the tire air-pressure drop has occurred, the control device 10 at step 114 sends a command to the alarming unit 20 and controls the same to raise an alarm about the occurrence of the air pressure drop before advancing the program to step 116 thereby to terminate the program. On the other hand, when judging that tire air-pressure drop has not occurred, the control device 10 returns the program to step 102 and then, repetitively executes the processing of the steps 102, 110 and 112 each time a predetermined short time period expires until the occurrence of the tire air-pressure drop is judged at step 112.

As apparent from the foregoing description, the tire air-pressure alarming device detects a change in the air pressure of a tire from the relationship of the wheel speeds ωfl, ωfr, ωrl, ωrr of the four wheels and judges the occurrence of the air pressure drop from the result of such detection.

By the way, the wheel speed ω which is a parameter essential for detecting the variation in tire air-pressure variation is expressed by the following expressions 2 and 3.

$$\omega = (V0/(1+S)) \times (1/R) \qquad \text{(Expression 2)}$$

$$\omega = (V0/(1-F/D)) \times (1/R) \qquad \text{(Expression 3)}$$

Herein, symbol V0 denotes the body speed (vehicle speed) of the vehicle M, symbol S denotes the slip rate of the tire, symbol R denotes the rolling radius of the tire, symbol F denotes the traction or drive power of the vehicle M and symbol D denotes the driving stiffness. The driving stiffness D is represented by the gradient of the drive power F (or friction resistance μ) with the slip rate S being 0% and indicates the grip property of the tire relative to the drive power F (or friction resistance μ).

The foregoing expressions 2 and 3 can be derived as follows. The wheel speed ω can be expressed as the following expression 4 from the tread surface speed V and the rolling radius R of the tire, and the slip rate S can be expressed as the following expression 5 from the body speed V0 and the tread surface speed V.

$$\omega = V/R \qquad \text{(Expression 4)}$$

$$S = (V0 - V)/V \qquad \text{(Expression 5)}$$

The above expression 2 can be derived by transforming the above expressions 4 and 5 to eliminate the symbol V. Further, the drive power F can be expressed as the following expression 6 from the slip rate S and the driving stiffness D, and by transforming the expression 6, the slip rate S can be expressed as the following expression 7.

$$F = -S \times D \qquad \text{(Expression 6)}$$

$$S = -F/D \qquad \text{(Expression 7)}$$

Plugging the above expression 7 into the above equation 2 derives the foregoing expression 3.

As understood from the above expression 2 derived in this way, the wheel speed ω is the function of the slip rate S and the rolling radius R and can be defined by both of these parameters. Since the slip rate S is derived from the μ-S property (friction coefficient to slip rate property) of the tire, the wheel load W and the drive power F, the wheel speed ω is also the function of the μ-S property and the rolling radius R and can be defined by both of these parameters. Further, since the slip rate S is derived from the F-S property (drive power to slip rate property) of the tire, the wheel speed ω is also the function of the μ-F property and the rolling radius R and can also be defined by these parameters.

Further, as understood from the above expression 3, the wheel speed ω is also the function of the drive power F, the driving stiffness D and the rolling radius R and can also be defined by these parameters. Herein, the drive power F and the wheel load W are those values depending from the property of the vehicle M and take the values determined in dependence upon vehicle by vehicle. Thus, the wheel speed ω is also the function of the driving stiffness D and the rolling radius R and can also be defined by both of these parameters.

Accordingly, the wheel speed ω can be defined by the following three patterns.

1) the μ-S property and the rolling radius R of the tire
2) the F-S property and the rolling radius R of the tire
3) the driving stiffness D and the rolling radius R of the tire That is, since the wheel speed ω is defined by any one of the foregoing three patterns, it results that the decision value α−α0 is defined based on the wheel speeds ωfl, ωfr, ωrl, ωrr of the four wheels, and thus, it can be realized to define the judgment performance of the tire air-pressure alarming device. Accordingly, the judgment performance of the tire air-pressure alarming device can be controlled by controlling the μ-S property and the rolling radius R of the tire, the F-S property and the rolling radius R of the tire or the driving stiffness D and the rolling radius R of the tire. Each of the μ-S property, the F-S property and the driving stiffness D represents the grip property of the tire, and it can be realized to control the judgment performance of the tire air-pressure alarming device by controlling the grip property and the rolling radius.

Further, since the rolling radius R is large in the rate of contribution to the judgment performance of the tire air-pressure alarming device, it can be realized to substantially control the judgment performance of the tire air-pressure alarming device by controlling the rolling radius R only. Instead, it may be done to control any one only of the μ-S property, the F-S property and the driving stiffness D. The foregoing grip property and the rolling radius are the property values of the tire.

Further, as apparent from the above expression 1, since the decision value $\alpha - \alpha 0$ $\alpha$ is derived based on the different wheel speed ratios $\omega fr/\omega fl$ and $\omega rr/\omega rl$ each employing two wheels, the judgment performance of the tire air-pressure alarming device is made to be different in dependence upon the variation rates of the wheel speeds $\omega fr$, $\omega fl$, $\omega rr$, $\omega rl$ of the four wheels. Accordingly, it is preferable to control the judgment performance of the tire air-pressure alarming device by controlling the variation rates of the vehicle speed, the wheel load and the air pressure regarding the parameters included in each of the foregoing three patterns which have influences on the variation rates of the wheel speeds $\omega fr$, $\omega fl$, $\omega rr$, $\omega rl$ of the four wheels, that is, regarding the μ-S property and the rolling radius R of the tire, the F-S property and the rolling radius R of the tire, or the driving stiffness D and the rolling radius R of the tire.

Next, description will be made regarding a control method for the tires which are monitored by the foregoing air pressure alarming device. The property values of the tire can be controlled, as described above, by controlling the variation rates of the vehicle speed, the wheel load and the air pressure about the rolling radius R and the driving stiffness D. More specifically, speed dependency, load dependency and pressure dependency are standardized for the rolling radius R and the driving stiffness D. Then, tires are produced or selected so that they can fall within the respective standards.

Figure 4:
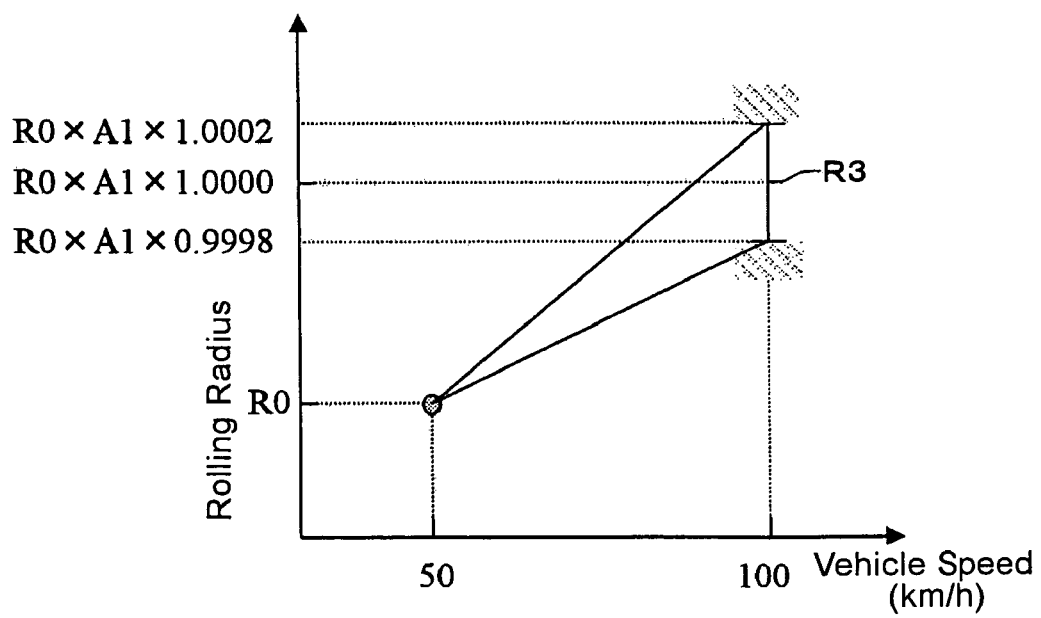
FIG. 4 is a graph showing the vehicle speed dependency of a rolling radius property of a tire.

As shown in FIG. 4, a standard for the speed dependency of the rolling radius is set so that a rolling radius in a high speed state as a predetermined state falls within a predetermined range R3 which is set on a basis of a rolling radius R in a reference state. Herein, the speed dependency of the rolling radius means the variation rate of the rolling radius to the change in the vehicle speed. The reference state means a state wherein the vehicle speed, the tire air pressure and the wheel load are respectively under predetermined conditions, and in this particular embodiment, it means a state with the vehicle speed being at a first speed (e.g., 50 km/h), with the tire air pressure being a first pressure (e.g., 200 kPa) and with the wheel load being a first load (e.g., 200 kgf). The high speed state means a state that vehicle speed is a second speed (e.g., 100 km/h) faster than the first speed. A predetermined range R3 in the high speed state means a range which takes as its center a value (R0×A1×1.0000) obtained by multiplying a predetermined coefficient (e.g., A1×1.0000) with a rolling radius R0 in the reference state and which has a predetermined width (e.g., R0×A1×0.0002) at either side. The predetermined coefficient and width have been set taking the brand of the tire, the wheel load and the like into consideration and have been set so that the decision value $\alpha - \alpha 0$ under a reference pressure (referred to later) falls within the predetermined range. Herein, the first pressure and a second pressure are set respectively to a reference pressure and a judgment pressure referred to later.

Next, description will be made regarding a method of measuring the rolling radius of the tire in this case. This measurement uses a tire testing system (so called "drum tester" or "flat belt tester") which is generally known in the art. A tire being an object for measurement is set on the tire testing system, and the rolling radius R0 is measured of the tire kept in the reference state. Then, a rolling radius R of the tire in the high speed state is measured in each of the following cases. In the beginning, the air pressure and the wheel load of the tire are kept respectively under the first pressure and the first load, in which state the vehicle speed is increased, so that there is measured a rolling radius of the tire at the second speed (e.g., 100 km/h). Further, with the vehicle speed and the air pressure kept respectively at the second speed and under the first pressure, the wheel load is set to a second load (e.g., 500 kgf), in which state measurement is done for a rolling radius of the tire. The tire measured is judged to meet the standard where the results of the both measurements fall within the predetermined range R3 shown in FIG. 4, but is judged not to meet the standard where either one of the results falls outside the predetermined range R3.

Figure 5:
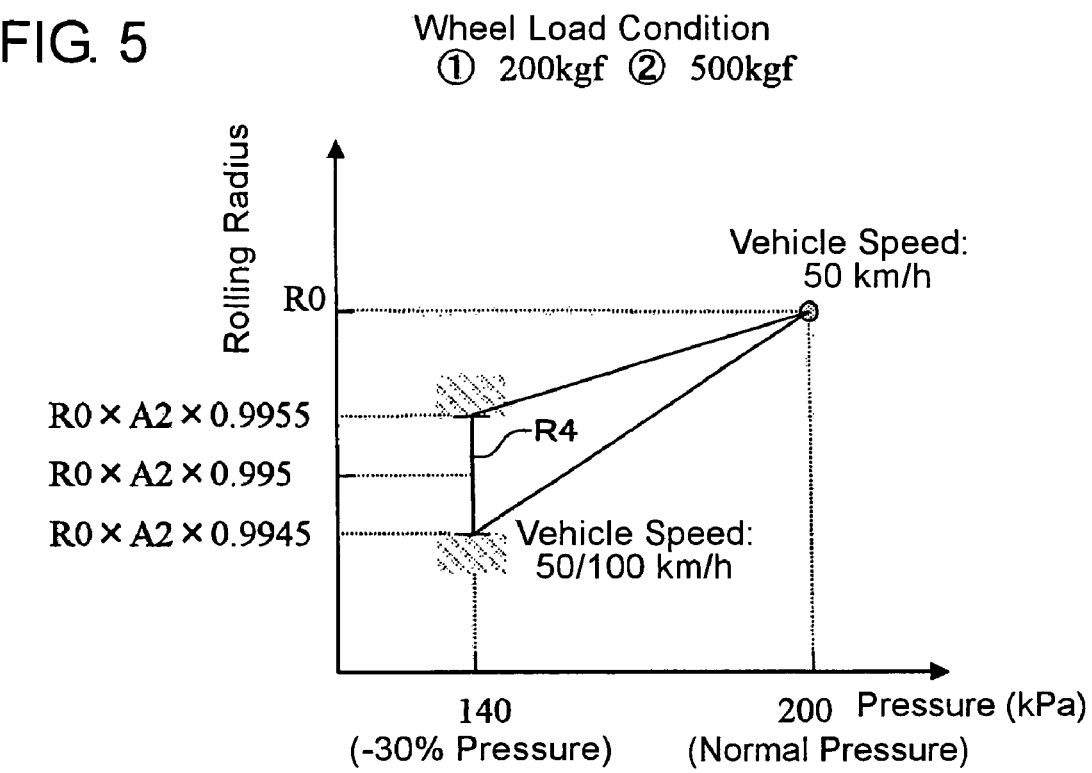
FIG. 5 is a graph showing the pressure dependency of the rolling radius property of the tire.

As shown in FIG. 5, a standard for the pressure dependency of the rolling radius is set so that a rolling radius in a reduced pressure state as a predetermined state falls within a predetermined range R4 which is set on a basis of the rolling radius R0 in the reference state. Herein, the pressure dependency of the rolling radius means the variation rate in the rolling radius to the change in the tire air pressure. Like in the case of the vehicle speed dependency of the rolling radius, the reference state means a state in which the vehicle speed, the tire air-pressure and the wheel load are respectively under predetermined conditions. The reduced pressure state means a state that the tire air pressure is a second pressure (e.g., 140 kPa less by 30%) lower than the first pressure. The predetermined range R4 in the reduced pressure state means a range which takes as its center a value (R0×A2×0.995) obtained by multiplying a predetermined coefficient (e.g., A2×0.995) with the rolling radius R0 in the reference state and which has a predetermined width (e.g., R0×A2×0.0005) at either side. These predetermined coefficient and width have been set taking the brand of the tire, the wheel load, the extent of the vehicle speed and the like into consideration and have been set so that the decision value $\alpha - \alpha 0$ in a judgment pressure referred to later falls within the predetermined range R4.

Next, description will be made as to a method of measuring the rolling radius of the tire in this case. This measurement also uses the tire testing system. A tire being an object for measurement is set on the tire testing system, and the rolling radius R0 is measured of the tire kept in the reference state. Then, the rolling radius of the tire in the reduced pressure state is measured in each of the following cases. In the beginning, the vehicle speed and the wheel load are kept respectively at the first speed and under the first load, in which state the air pressure of the tire is reduced, so that there is measure a rolling radius of the tire under the second pressure (e.g., 140 kPa). Further, with the tire air pressure and the wheel load kept respectively under the second pressure and the first load, the vehicle speed is set to the second speed, in which state measurement is done for the rolling radius of the tire. Furthermore, the wheel load is increased to the second load with the tire air pressure remaining under the second pressure, in which state the rolling radius of the tire is measured in each of the cases that the vehicle speed is set to the first and second speeds. The tire measured is judged to meet the standard where the results of all the measurements fall within the foregoing predetermined range R4 shown in FIG. 5, but is judged not to meet the standard where any one of the results falls outside the predetermined range R4.

Figure 6:
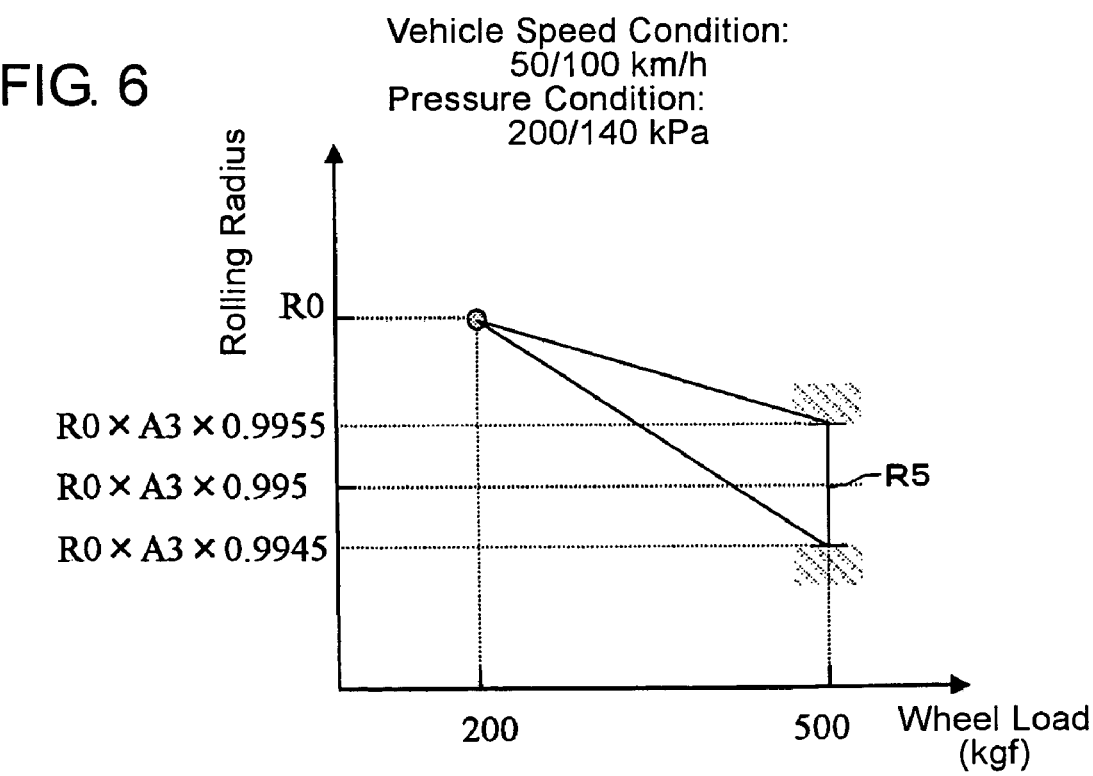
FIG. 6 is a graph showing the load dependency of the rolling radius property of the tire.

As shown in FIG. 6, a standard for the wheel load dependency of the rolling radius has been set so that a rolling radius in an increased load state as a predetermined state falls within a predetermined range R5 which is set on a basis of the rolling radius R0 in the reference state. Herein, the wheel load dependency of the rolling radius means the variation rate in the rolling radius to the change in the wheel load. Like in the case of the vehicle speed dependency of the rolling radius, the reference state means a state wherein the vehicle speed, the tire air pressure and the wheel load are respectively under predetermined conditions. The increased load state means a state in which the wheel load is the second load (e.g., 500 kgf) heavier than the first load. The predetermined range R5 in the increased load state means a range which takes as its center a value (R0 ×A3 ×0.995) obtained by multiplying a predetermined coefficient (e.g., A3 ×0.995) with the rolling radius R0 in the reference state and which has a predetermined width (e.g., R0 ×A3 ×0.0005) at either side. These predetermined coefficient and width have been set taking the brand of the tire, the tire air pressure, the change extent of the vehicle speed and the like into consideration.

Next, description will be made as to a method of measuring the rolling radius of the tire in this case. This measurement also uses the tire testing system. A tire being an object for measurement is set on the tire testing system, and the rolling radius R0 is measured of the tire kept in the reference state. Then, the rolling radius of the tire in the increased load state is measured in the following case. In the beginning, the vehicle speed and the tire air pressure are kept respectively at the first speed and under the first pressure, in which state the wheel load is increased, so that a rolling radius is measured of the tire having the second load (e.g., 500 kgf) exerted thereon. Further, with the tire air pressure and the wheel load kept respectively under the first pressure and the second load, the vehicle speed is increased, so that there is measured a rolling radius of the tire at the second speed (100 kmlh). Furthermore, the tire air pressure is reduced to the second pressure (140 kPa) with the wheel load remaining under the second load, in which state there is measured a rolling radius of the tire in each of the cases that the vehicle speed is set to the first and second speeds. The tire measured is judged to meet the standard where the results of all the measurements fall within the foregoing predetermined range R5 shown in FIG. 6, but is judged not to meet the standard where any one of the results falls outside the predetermined range R5.

Figure 7:
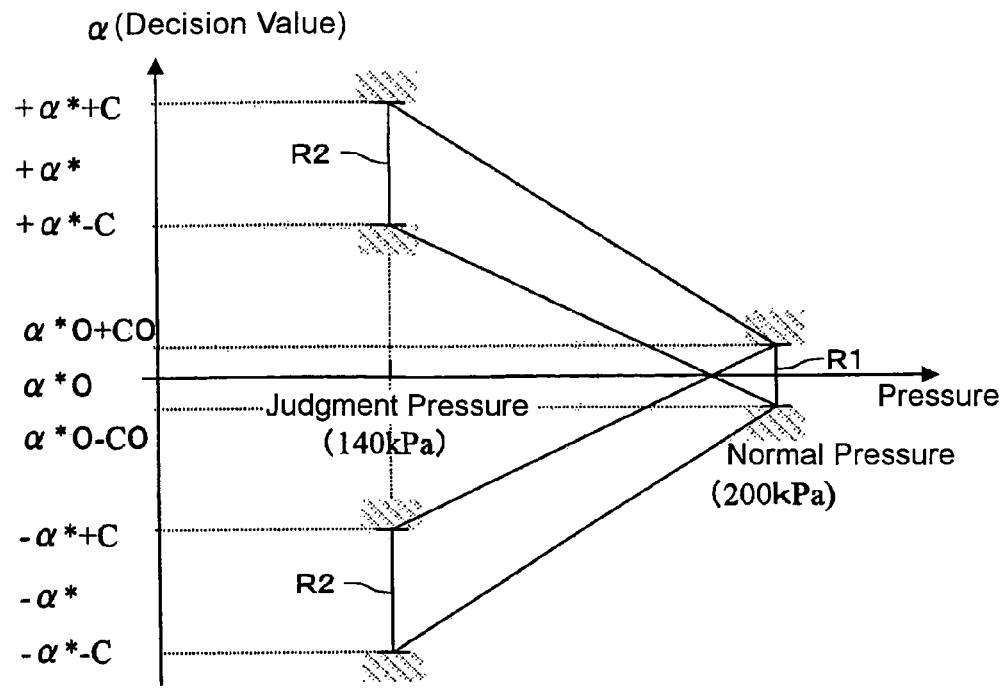
FIG. 7 is a chart showing a standard for decision values.

The rolling radius of each tire can be standardized in the foregoing manner. Thus, it can be realized to standardize the foregoing decision value $\alpha-\alpha 0$ and hence, it can be realized to standardize the performance in judging the tire air-pressure drop, of the tire air-pressure alarming device for monitoring the tires placed on the vehicle. This is for the following reasons. Firstly, the standard for the speed dependency of the rolling radius is the value which the rolling radius can take where the body speed is changed under the first pressure or the reference pressure. Second, the standard for the pressure dependency of the rolling radius is the value which the rolling radius can take where the body speed and/or the wheel load are changed under the second pressure or the judgment pressure. Accordingly, in the vehicle having placed thereon the tires whose speed dependency and pressure dependency fall within the standards shown in FIGS. 4 and 5, the decision value $\alpha-\alpha 0$ derived by the tire air-pressure alarming device comes to fall within the first and second predetermined ranges R1, R2 respectively under the normal pressure and the judgment pressure, as shown in FIG. 7. The first predetermined range R1 is the range of $\alpha^*0-C0 \leq R1 \leq \alpha^*0+C0$. The second predetermined range R2 is the range between $\alpha^*-C \leq R2 \leq \alpha^*+C$ and $-\alpha^*-C \leq R2 \leq -\alpha^*+C$ and is composed of upper and lower ranges. Here, symbol a*O represents the center value of the predetermined range R1 (i.e., 0 in this embodiment). Symbols $\alpha^*$ and $-\alpha^*$ respectively represent the center values of the upper and lower ranges of the second predetermined range R2. The larger the absolute values $|\alpha^*|$ and $|-\alpha^*|$ of the $\alpha^*$ and $-\alpha^*$, namely, the value of $\alpha^*$ becomes, the further the center values of both of the upper and lower ranges of the second predetermined range R2 goes far from the center value $\alpha^*0$ of the first predetermined range R1, so that the sensitivity in the judgment performance can be enhanced. Further, symbols C0 and C are constants, and the judgment performance can be improved as these values become smaller.

As is clear from the foregoing description, in the present embodiment, the performance in judging the tire air-pressure drop of the tire air-pressure alarming device provided with air-pressure drop judging means is standardized by establishing the standard for the rolling radius of the tire which is one of the property values of the tire. As a consequence, by controlling the property value of the tire exactly and surely, it can be realized to improve the accuracy in detecting the tire air-pressure drop.

As shown in FIG. 7, the judgment performance of the tire air-pressure alarming device is standardized so that the decision value $\alpha-\alpha 0$ falls within the first predetermined range R1 in the case of the tire air pressure being the normal pressure and falls within the second predetermined range R2 in the case of the tire air pressure being the judgment pressure. That is, the dispersion of decision values $\alpha-\alpha 0$ with the tires being under the normal pressure can be suppressed to be small, and at the same time, the fluctuation in the sensitivity (gradient) of decision values $\alpha-\alpha 0$ with the tires being under the judgment pressure can be suppressed to be small as well. As a result, it can be realized to suppress as few as possible the occurrences of troubles such as detecting the air-pressure drop irrespective of each tire being under a sufficient air pressure and the failure in detecting the air-pressure drop irrespective of the tire air-pressure being lower than a judgment lower limit. Further, since the dispersion can be relieved of the property changes in the vehicle speed, the wheel load and the tire air pressure, it can be realized to accurately detect the air-pressure drop even when changes take place in the properties of the vehicle speed, the wheel load and the tire air pressure.

Further, it can also be realized to control a property of the tire simply and easily by utilizing the rolling radius of the tire as the property value of the tire. In addition, where the rolling radius of the tire is utilized as the property value of the tire, standardization is established so that the property value of the tire measured in the predetermined state in which at least one of the vehicle speed, the wheel load and the tire air pressure is varied from the reference state for the tire falls within the predetermined range. As a result, it can be realized to standardize the performance in judging the tire air-pressure drop reliably and accurately.

Figure 8:
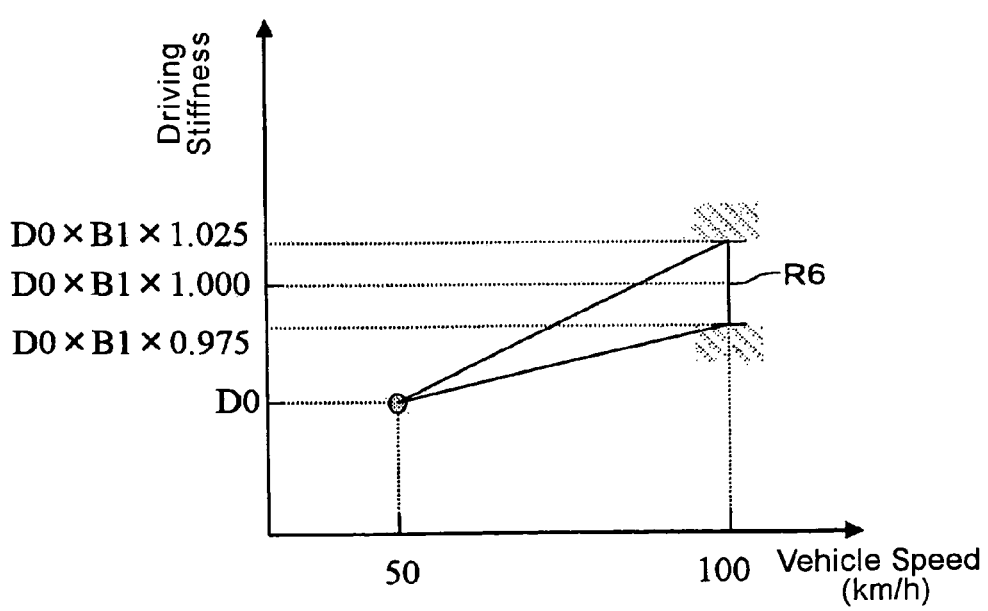
FIG. 8 is a graph showing the vehicle speed dependency of a driving stiffness of a tire.

Although in the foregoing embodiment, description has been made in detail regarding the case where the rolling radius is utilized as the property value of the tire, description will then be made in detail with reference to FIGS. 7 to 10 regarding another case where a grip property is utilized and in particular, where a driving stiffness is utilized as the grip property. Where the driving stiffness which is one of grip properties is used as the property value of the tire, a standard for the speed dependency thereof is set so that as shown in FIG. 8, the driving stiffness in the high speed state as the reference state falls within a predetermined range R6 which is set on a basis of a driving stiffness D0 in the reference state. Herein, the speed dependency of the driving stiffness means the variation rate of the driving stiffness to the change in the vehicle speed. The reference state means a state in which the vehicle speed, the tire air pressure and the wheel load are respectively under constant conditions, and in this embodiment, means a state with the vehicle speed being a first speed (e.g., 50 km/h), with the tire air pressure being a first pressure (e.g., 200 kPa) and with the wheel load being a first load (e.g., 200 kgf). The high speed state means a state wherein the vehicle speed is a second speed (e.g., 100 km/h) faster than the first speed. A predetermined range R6 in the high speed state is a range which takes as its center a value (D0×B1×1.000) obtained by multiplying a predetermined coefficient (e.g., B1×1.000) with the driving stiffness D0 in the reference state and which has a predetermined width (e.g., D0×B1×0.025) at either side. These predetermined coefficient and width have been set taking the brand of the tire, the wheel load and the like into consideration.

Next, description will be made as to a method of measuring the driving stiffness of the tire in this case. This measurement also uses the foregoing tire testing system. A tire being an object for measurement is set on the tire testing system, and the driving stiffness D0 is measured of the tire kept in the reference state. Then, the driving stiffness of the tire in the high speed state is measured in each of the following cases. In the beginning, the tire air pressure and the wheel load are kept respectively under the first pressure and the first load, in which state the vehicle speed is increased, so that the driving stiffness is measured of the tire at a second speed (e.g., 100 km/h). Further, with the vehicle speed and the air pressure kept respectively at the second speed and under the first pressure, the wheel load is increased, so that the driving stiffness is measured of the tire under a second load (e.g., 500 kgf). The tire measured is judged to meet the standard where the results of the both measurements fall within the foregoing predetermined range R6 shown in FIG. 8, but is judged not to meet the standard where any one of the results falls outside the predetermined range R6.

Figure 9:
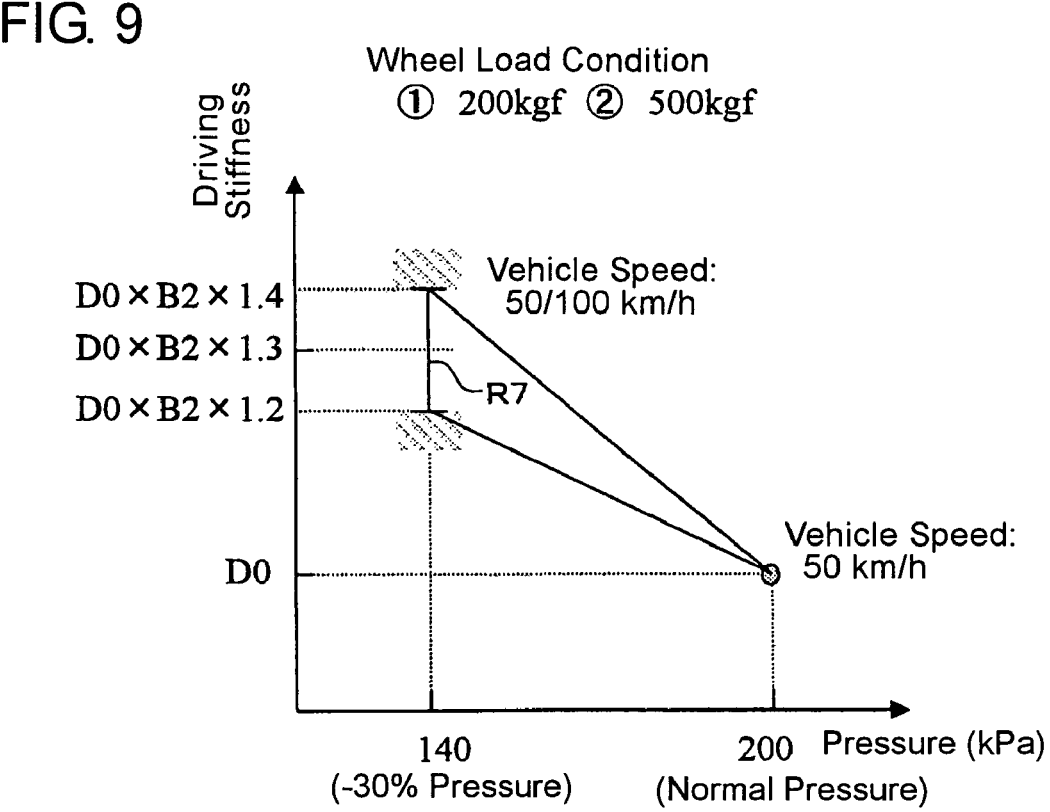
FIG. 9 is a graph showing the pressure dependency of the driving stiffness of the tire.

As shown in FIG. 9, a standard for the pressure dependency of the driving stiffness has been set so that a driving stiffness in a reduced pressure state as a predetermined state falls within a predetermined range R7 which is set on a basis of the driving stiffness D0 in the reference state. Herein, the pressure dependency of the driving stiffness means the variation rate of the driving stiffness to the change in the tire air pressure. Like in the case of the vehicle speed dependency of the driving stiffness, the reference state means a state in which the vehicle speed, the tire air pressure and the wheel load are respectively under predetermined conditions. The reduced pressure state means a state in which the tire air pressure is a second pressure (e.g., 140 kPa decreased by 30%) lower than the first pressure. The predetermined range R7 in the reduced pressure state means a range which takes as its center a value (D0×B2×1.3) obtained by multiplying a predetermined coefficient (e.g., B2×1.3) with the driving stiffness D0 in the reference state and which has a predetermined width (e.g., D0×B2×0.1) at either side. These predetermined coefficient and width have been set taking the brand of the tire, the wheel load, the extent of the vehicle speed and the like into consideration.

Next, description will be made as to a method of measuring the driving stiffness of the tire in this case. This measurement also uses the tire testing system. A tire being an object for measurement is set on the tire testing system, and a driving stiffness D0 is measured of the tire kept in the reference state. Then, a driving stiffness of the tire in the reduced pressure state is measured in each of the following cases. In the beginning, the vehicle speed and the wheel load are kept respectively at the first speed and under the first load, in which state the tire air pressure is decreased, so that a driving stiffness is measured of the tire under the second pressure (e.g., 140 kPa). Further, with the tire air pressure and the wheel load kept respectively under the second pressure and the first load, the vehicle speed is increased, so that a driving stiffness is measured of the tire at the second speed of the vehicle speed. Furthermore, the wheel load is increased to the second load with the tire air pressure kept under the second pressure, in which state a driving stiffness is measured of the tire at each of the first and second speeds of the vehicle speed. The tire measured is judged to meet the standard where all the results of these measurements fall within the foregoing predetermined range R7 shown in FIG. 9, but is judged not to meet the standard where any one of the results falls outside the predetermined range R7.

Figure 10:
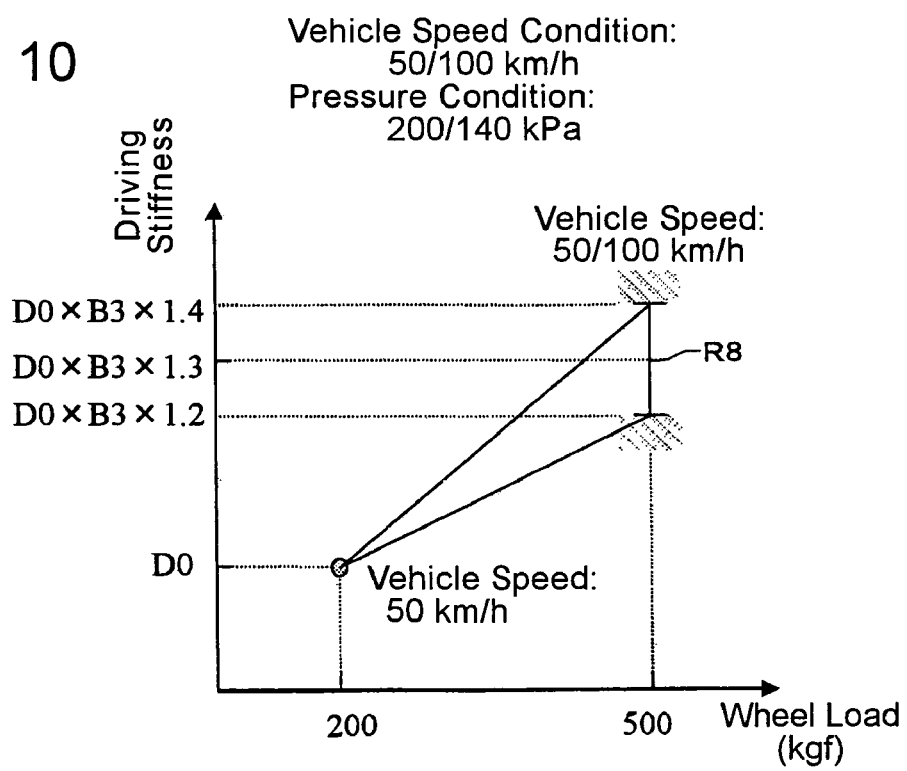
FIG. 10 is a graph showing the load dependency of the driving stiffness of the tire.

As shown in FIG. 10, a standard for the wheel load dependency of the driving stiffness has been set so that a driving stiffness in an increased load state as a predetermined state falls within a predetermined range R8 which is set on a basis of a driving stiffness D0 in the reference state. Herein, the wheel load dependency of the driving stiffness means the variation rate of the driving stiffness to the change in the wheel load. Like in the case of the vehicle speed dependency of the driving stiffness, the reference state means a state in which the vehicle speed, the tire air pressure and the wheel load are respectively under predetermined conditions. The increased load state means a state in which the wheel load is a second load (e.g., 500 kgf) heavier than the first load (e.g., 200 kgf). The predetermined range R8 in the increased load state means a range which takes as its center a value (D0×B3×1.3) obtained by multiplying a predetermined coefficient (e.g., B3×1.3) with the driving stiffness D0 in the reference state and which has a predetermined width (e.g., D0×B3×0.1) at either side. These predetermined coefficient and width have been set taking the brand of the tire, the tire air pressure, the change extent of the vehicle speed and the like into consideration.

Next, description will be made as to a method of measuring the driving stiffness of the tire in this case. This measurement also uses the tire testing system. A tire being an object for measurement is set on the tire testing system, and the driving stiffness D0 is measured of the tire kept in the reference state. Then, a driving stiffness of the tire in the increased load state is measured in the following case. In the beginning, the vehicle speed and the tire air pressure are kept respectively at the first speed (e.g., 50 km/h) and under the first pressure (e.g., 200 kPa), in which state the wheel load is increased, so that a driving stiffness is measured of the tire under the second load (e.g., 500 kgf). Further, with the tire air pressure and the wheel load kept respectively under the first pressure and the first load, the vehicle speed is increased, so that a driving stiffness is measured of the tire at the second speed (e.g., 100 km/h) of the vehicle speed. Furthermore, the tire air pressure is decreased to the second pressure (e.g., 140 kPa) with the wheel load kept under the second load, in which state a driving stiffness is measured of the tire at each of the first and second speeds of the vehicle speed. The tire measured is judged to meet the standard where all the results of these measurements fall within the foregoing predetermined range R8 shown in FIG. 10, but is judged not to meet the standard where any one of the results falls outside the predetermined range R8.

The driving stiffness of each tire can be standardized in the foregoing manner. Thus, it can be realized to standardize the foregoing decision value $\alpha-\alpha 0$ and hence, it can be realized to standardize the performance in judging the tire air-pressure drop of the tire air-pressure alarming device for monitoring the tires placed on the vehicle. This is for the following reasons. Firstly, the standard for the speed dependency of the driving stiffness is the value which the driving stiffness can take where the vehicle speed is changed under the first pressure or the reference pressure. Second, the pressure dependency of the driving stiffness is the value which the driving stiffness can take where the vehicle speed and/or the wheel load are changed under the second pressure or the judgment pressure. Accordingly, in the vehicle having placed thereon the tires whose speed dependency and pressure dependency of the driving stiffness fall within the standards shown in FIGS. 8 and 9, the decision value $\alpha-\alpha 0$ derived by the tire air-pressure alarming device comes to fall within the first and second predetermined ranges R1, R2 respectively under the reference pressure and the judgment pressure, as shown in FIG. 7.

As is clear from the foregoing description, also in the present embodiment taking the grip property as the property value of the tire, the performance in judging the air-pressure drop of the tire air-pressure alarming device provided with air-pressure drop judging means is standardized by establishing the standard for the grip property which is one of the property values of the tire. As a consequence, by controlling the tire property exactly and surely, it can be realized to improve the accuracy in detecting the tire air-pressure drop.

As to the judgment performance of the tire air-pressure alarming device, as shown in FIG. 7, the decision value $\alpha-\alpha 0$ is standardized to fall within the first predetermined range R1 in the case of the tire air-pressure being the reference pressure (i.e., normal pressure) and to fall within the second predetermined range R2 in the case of the tire air-pressure being the judgment pressure. That is, the dispersion of the decision values $\alpha-\alpha 0$ under the reference pressure can be suppressed to be small, and at the same time, the fluctuation in the sensitivity (gradient) of the decision values $\alpha-\alpha 0$ under the judgment pressure can be suppressed to be small as well. As a result, it can be realized to suppress as few as possible the occurrences of troubles such as detecting the air pressure drop irrespective of the tires being under a sufficient air pressure and the failure in detecting the air-pressure drop irrespective of the tire air-pressure being lower then the judgment lower limit.

Further, it can also be realized to control a tire property simply and easily by utilizing the grip property of the tire as the property value of the tire. In addition, where the grip property of the tire is utilized as the property value of the tire, standardization is established so that the property value of the tire measured in the predetermined state in which at least one of the vehicle speed, the wheel load and the tire air pressure is varied from the reference state for the tire falls within the predetermined range. As a result, it can be realized to standardize the performance in judging the tire air-pressure drop reliably and accurately. In addition, it can be realized to easily employ the grip property by utilizing the driving stiffness as the grip property.

Instead, the grip property may be substituted by the friction efficiency to slip rate property or by the drive power to slip rate property. In this case, there can be expected the same functions and the same effects as those in the case that the driving stiffness is utilized as described earlier.

The present invention can also be applied to any tire air-pressure alarming device which is designed to derive a decision value $\alpha-\alpha 0$ based on a mathematical expression different from the foregoing expression 1 as far as it is of the type that judges the tire air-pressure drop in dependence on the decision value $\alpha-\alpha 0$ which is derived based on the vehicle speeds of four wheels.

Various features and many of the attendant advantages in the foregoing embodiment will be summarized as follows:

In the tire monitored by the tire air-pressure alarming device in the foregoing embodiment, the performance in judging the air-pressure drop of the tires by the air-pressure drop judging means is standardized by standardizing a property value (e.g., rolling radius, grip property or driving stiffness) of the tires. Therefore, the accuracy in detecting the air-pressure drop of the tires can be improved by controlling the property value of the tires.

Also in the tire monitored by the tire air-pressure alarming device in the foregoing embodiment, the judgment performance is standardized so that the decision value $\alpha-\alpha 0$ falls within the first predetermined range R1 where the tire air-pressure is the normal pressure (e.g., 200 kPa), but falls within the second predetermined range R2 where the tire air-pressure is the judgment pressure (e.g., 140 kPa). That is, the dispersion of the decision values $\alpha-\alpha 0$ is suppressed to be small in the normal pressure, and the fluctuation in the sensitivity (gradient) of the decision values $\alpha-\alpha 0$ is also suppressed to be small in the judgment pressure. As a result, it can be realized to suppress as few as possible the occurrences of troubles such as detecting the air-pressure drop irrespective of the tires being under a sufficient air pressure and the failure in detecting the air-pressure drop irrespective of the tire air-pressure being lower then the judgment lower limit.

Also in the tire monitored by the tire air-pressure alarming device in the foregoing embodiment, since at least one of the rolling radius and the grip property of the tire is utilized as the property value of the tires, it can be realized to control the property of the tires simply and easily.

Also in the tire monitored by the tire air-pressure alarming device in the foregoing embodiment, since at least one of the friction coefficient to slip rate property, the drive power to slip rate property and the driving stiffness is utilized as the grip property, it can be realized to utilize the grip property easily.

Also in the tire monitored by the tire air-pressure alarming device in the foregoing embodiment, the rolling radius of the tires is utilized as the property value of the tires, in which case standardization is set up so that the property value of the tires which is detected in the predetermined state that at least one of the vehicle speed, the wheel load and the air pressure is varied from the reference state falls within the predetermined range (R3, R5 or R4). Thus, it can be realized to standardize the judgment performance for the tire air-pressure drop reliably and accurately.

Also in the tire monitored by the tire air-pressure alarming device in the foregoing embodiment, the grip property of the tire is utilized as the property value of the tires, in which case standardization is set up so that the property value of the tires which is detected in the predetermined state that at least one of the vehicle speed, the wheel load and the air pressure is varied from the reference state falls within the predetermined range (R3, R5 or R4). Thus, it can be realized to standardize the judgment performance for the tire air-pressure drop reliably and accurately.

In the control method for the property value of the tires in the foregoing embodiment, the performance in judging the air-pressure drop of the tires by the air-pressure drop judging means is standardized by standardizing a property value (e.g., rolling radius, grip property or driving stiffness) of the tires. Therefore, the property of the tires is controlled accurately and reliably, so that the accuracy in detecting the air-pressure drop of the tires can be improved.

Also in the control method for the property value of the tires in the foregoing embodiment, the judgment performance is standardized so that the decision value $\alpha-\alpha 0$ falls within the first predetermined range R1 where the tire air-pressure is the normal pressure (e.g., 200 kPa), but falls within the second predetermined range R2 where the tire air-pressure is the judgment pressure (e.g., 140 kPa). That is, the deviation of the decision values $\alpha-\alpha 0$ is suppressed to be small at the normal pressure, and the fluctuation in the sensitivity (gradient) of the decision values $\alpha-\alpha 0$ is also suppressed to be small at the judgment pressure. As a result, it can be realized to suppress as few as possible the occurrences of troubles such as detecting the air-pressure drop irrespective of the tires being under a sufficient air pressure and the failure in detecting the air-pressure drop irrespective of the tire air-pressure being lower then the judgment lower limit.

Also in the control method for the property value of the tires in the foregoing embodiment, since at least one of the rolling radius and the grip property of the tires is utilized as the property value of the tires, it can be realized to control the property of the tires simply and easily.

Also in the control method for the property value of the tires in the foregoing embodiment, since at least one of the friction coefficient to slip rate property, the drive power to slip rate property and the driving stiffness is utilized as the grip property, it can be realized to utilize the grip property easily.

Also in the control method for the property value of the tires in the foregoing embodiment, the rolling radius of the tires is utilized as the property value of the tires, in which case standardization is set up so that the property value of the tires which is detected in the predetermined state that at least one of the vehicle speed, the wheel load and the air pressure is varied from the reference state falls within the predetermined range (R3, R5 or A4). Thus, it can be realized to standardize the judgment performance for the tire air-pressure drop reliably and accurately.

Also in the control method for the property value of the tires in the foregoing embodiment, the grip property of the tire is utilized as the property value of the tires, in which case standardization is set up so that the property value of the tires which is detected in the predetermined state that at least one of the vehicle speed, the wheel load and the air pressure is varied from the reference state falls within the predetermined range (R3, R5 or R4). Thus, it can be realized to standardize the judgment performance for the tire air-pressure drop reliably and accurately.

In the tire air-pressure alarming device in the foregoing embodiment, the performance in judging the air-pressure drop of the tires is standardized by standardizing a property value (e.g., rolling radius, grip property or driving stiffness) of the tires. Therefore, the accuracy in detecting the air-pressure drop of the tires can be improved by controlling the property of the tires.

Also in the tire air-pressure alarming device in the foregoing embodiment, the judgment performance is standardized so that the decision value $\alpha-\alpha 0$ falls within the first predetermined range R1 where the tire air-pressure is the normal pressure (e.g., 200 kPa), but falls within the second predetermined range R2 where the tire air-pressure is the judgment pressure (e.g., 140 kPa). That is, the dispersion of the decision values $\alpha-\alpha 0$ is suppressed to be small under the normal pressure, and the fluctuation in the sensitivity (gradient) of the decision values $\alpha-\alpha 0$ is also suppressed to be small under the judgment pressure. As a result, it can be realized to suppress as few as possible the occurrences of troubles such as detecting the air-pressure drop irrespective of the tires being under a sufficient air pressure and the failure in detecting the air-pressure drop irrespective of the tire air-pressure being lower then the judgment lower limit.

Also in the tire air-pressure alarming device in the foregoing embodiment, since at least one of the rolling radius and the grip property of the tires is utilized as the property value of the tires, it can be realized to control the property of the ties simply and easily.

Obviously, other numerous modifications and variations of the present invention are possible in light of the above teachings. It is therefore to be understood that within the scope of the appended claims, the present invention may be practiced otherwise than as specifically described herein.

What is claimed is:

1. Tires attached to wheels of a vehicle and monitored by a tire air-pressure alarming device which is incorporated in the vehicle and comprises wheel speed detection means for detecting wheel speeds of the wheels of the vehicle; judgement value deriving means for deriving a judgment value based on the wheel speeds detected by the wheel speed detection means; air-pressure drop judging means for judging the occurrence of air-pressure drop of the tires constituting the wheels, based on the judgment value derived by the judgment value deriving means; and alarming means for raising an alarm when the occurrence of the air-pressure drop of the tires to a judgment pressure is judged by the air-pressure drop judging means;

wherein the wheel speed detection means pick up the rotations of the wheels;

wherein each of the tires is selected to have a controlled property value which falls within a predetermined range when detected in a predetermined state that at least one of vehicle speed, wheel load and air pressure is varied from a reference state; and wherein the performance of the tire air-pressure alarming device in judging the air-pressure drop of the tires by the air-pressure drop judging means is standardized by using the tires each of which has been selected to have the controlled property value and by correlating the controlled property values of the tires with the judgment value.

2. The tires as set forth in claim 1, wherein the judging performance is standardized so that the judgment value falls within a first predetermined range where the tire air-pressure of each of the tires is a normal pressure, but falls within a second predetermined range where the tire air-pressure of any one of the tires is the judgment pressure.

3. The tires as set forth in claim 1, wherein at least one of a rolling radius and a grip property of the tires is utilized as the controlled property value in selecting the tires to be monitored by the tire air-pressure alarming device.

4. The tires as set forth in claim 3, wherein at least one of a friction coefficient to slip rate property, a drive power to slip rate property and a driving stillness is utilized as the grip property.

5. The tires as set forth in claim 3, wherein the rolling radius of the tire is utilized as the property value in selecting the tires to be monitored by the tire air-pressure alarming device, in which case the correlation of the controlled property values of the tires with the judgment value is set up by selecting the tires so that the controlled property values of the selected tires fall within a predetermined range when detected in a predetermined state that at least one of vehicle speed, wheel load and air pressure is varied from a reference state.

6. The tires as set forth in claim 3, wherein the grip property of the tire is utilized as the property value in selecting the tires to be monitored by the tire air-pressure alarming device, in which case the correlation of the controlled property values of the tires with the judgment value is set up so that the controlled property values of the selected tires fail within a predetermined range when detected in a predetermined state that at least one of vehicle speed, wheel load and air pressure is varied from a reference state.

7. A control method for property values of tires attached to wheels of a vehicle and monitored by a tire air-pressure alarming device which is incorporated in the vehicle
detecting, in a wheel speed detection means, wheel speeds of the wheels of the vehicle, wherein the wheel speed detection means pick up rotations of the wheels;
deriving, in a judgment value deriving means a judgment value based on the wheel speeds detected by the wheel speed detection means;
judging, in an air-pressure drop judging means, the occurrence of air-pressure drop of the tires constituting the wheels, based on the judgment value derived by the judgment value deriving means; and
raising an alarm, in an alarming means, when the occurrence of the air-pressure drop of the tires to a judgment pressure is judged by the air-pressure drop judging means;
wherein each of the tires is selected to have a controlled property value which falls within a predetermined range when detected in a predetermined state that at least one of vehicle speed, wheel load and air pressure is varied from a reference state; and
wherein the performance of the tire air-pressure alarming device in judging the air-pressure drop of the tires by the air-pressure drop judging means is standardized by using the tires each of which has been selected to have the controlled property value and by correlating a the controlled property values of the tires with the judgment value.

8. The control method as set forth in claim 7, wherein the judging performance is standardized so that the judgment value falls within a first predetermined range where the tire air-pressure of each of the tires is a normal pressure, but falls within a second predetermined range where the tire air-pressure of any one of the tires is the judgment pressure.

9. The control method as set forth in claim 7, wherein at least one of a rolling radius and a grip property of the tires is utilized as the controlled property value in selecting the tires to be monitored by the tire air-pressure alarming device.

10. The control method as set forth in claim 9, wherein at least one of a friction coefficient to slip rate property, a drive power to slip rate property and a driving stiffness is utilized as the grip property.

11. The control method as set forth in claim 9, wherein the rolling radius of the tires is utilized as the property value in selecting the tires to be monitored by the tire air-pressure alarming device, in which case the correlation of the controlled property values of the tires with the judgment value is set up by selecting the tires so that the controlled property values of the selected tires fall within a predetermined range when detected in a predetermined state that at least one of vehicle speed, wheel load and air pressure is varied from a reference state.

12. The control method as set forth in claim 9, wherein the grip property of the tire is utilized as the property value in selecting the tires to be monitored by the tire air-pressure alarming device, in which case the correlation of the controlled property values of the tires with the judgment value is set up so that the controlled property values of the selected tires fall within a predetermined range when detected in a predetermined state that at least one of vehicle speed, wheel load and air pressure is varied from a reference state.

13. A tire air-pressure alarming device incorporated in a vehicle and comprising:
wheel speed detection means for detecting wheel speeds of wheels of the vehicle, wherein the wheel speed detection means pick un rotations of the wheels;
judgment value deriving means for deriving a judgment value based on the wheel speeds detected by the wheel speed detection means;
air-pressure drop judging means for judging the occurrence of air-pressure drop of tires constituting the wheels, based on the judgment value derived by the judgment value deriving means; and
alarming means for raising an alarm when the occurrence of the air-pressure drop of the tires to a judgment pressure is judged by the air-pressure drop judging means;
wherein each of the tires is selected to have a controlled property value which falls within a predetermined range when detected in a predetermined state that at least one of vehicle speed, wheel load and air pressure is varied from a reference state; and
wherein the performance of the tire air-pressure alarming device in judging the air-pressure drop of the tires by the air-pressure drop judging means is standardized by using the tires each of which has been selected to have the controlled property value and by correlating a the controlled property values of the tires with the judgment value.

14. The tire air-pressure alarming device as set forth in claim 13, wherein the judging performance is standardized so that the judgment value falls within a first predetermined range where the tire air-pressure of each of the tires is a normal pressure, but falls within a second predetermined range where the tire air-pressure of any one of the tires is the judgment pressure.

15. The tire air-pressure alarming device as set forth in claim 13, wherein at least one of a rolling radius and a grip property of the tires is utilized as the controlled property value in selecting the tires to be monitored by the tire air-pressure alarming device.

16. An air-pressure alarming device for a vehicle, the device comprising:
wheel speed sensors to detect wheel speeds of wheels of the vehicle, wherein each of the wheels comprises a wheel and a tire; and
a control device for detecting if any of the tires is in a predetermined state in which at least one of vehicle speed, wheel load and air pressure is varied from a reference state, the control device assigning a controlled property value within a predetermined range to tires detected to be in the predetermined state, the control device deriving a judgment value based on die wheel speeds detected by the wheel speed sensors, wherein, if the control device has assigned one or more controlled property values to one or more of the tires, respectively, the control device correlates the judgment value to the one or more assigned controlled property values, the control device determining an occurrence of air-pressure drop of the tires based upon the judgment value.

17. The air-pressure alarming device as set forth in claim 16, further comprising an alarming device for raising an alarm when the occurrence of air-pressure drop of the tires is below a judgment pressure.

18. The air-pressure alarming device as set forth in claim 17, wherein the control device derives the judgment value based on the wheel speeds detected by the wheel speed sensors, and correlated to the one or more assigned controlled property values when the control device has assigned one or more controlled property values to one or more of the tires, respectively, to fall within a first predetermined range when tire air-pressure of each of the tires is a normal pressure, and to fall within a second predetermined, range when tire air-pressure of any one of the tires is the judgment pressure.

19. The air-pressure alarming device as set forth in claim 16, wherein the controlled property value comprises at least one of a rolling radius and a grip property of the tires.

* * * * *